（12）United States Patent
Goubau et al.

(10) Patent No.: US 7,249,406 B2
(45) Date of Patent: Jul. 31, 2007

(54) METHOD TO DETECT MAGNETIC POLE DEFECTS IN PERPENDICULAR RECORDING HEADS AT WAFER LEVEL

(75) Inventors: Wolfgang Goubau, Santa Cruz, CA (US); Edward Hin Pong Lee, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 348 days.

(21) Appl. No.: 11/068,334

(22) Filed: Feb. 28, 2005

(65) Prior Publication Data

US 2006/0191127 A1  Aug. 31, 2006

(51) Int. Cl.
*G11B 5/127* (2006.01)
*H04R 31/00* (2006.01)

(52) U.S. Cl. .............. 29/603.09; 29/603.1; 29/603.13; 29/603.14; 29/606; 360/121; 360/122; 360/126; 360/317; 324/210; 324/212; 324/613

(58) Field of Classification Search ............. 29/603.09, 29/603.1, 603.13, 603.14, 606; 324/210, 324/212, 613; 360/121, 122, 126, 317
See application file for complete search history.

(56) References Cited

U.S. PATENT DOCUMENTS

| | | | |
|---|---|---|---|
| 3,706,926 A | 12/1972 | Barrager et al. .............. 324/34 |
| 3,710,235 A | 1/1973 | Barrager et al. .............. 324/34 |
| 3,787,964 A | 1/1974 | Simon et al. .................. 29/603 |
| 4,390,916 A | 6/1983 | Chow et al. ................. 360/127 |
| 5,155,646 A * | 10/1992 | Fujisawa et al. ............ 360/126 |
| 5,473,491 A * | 12/1995 | Fujisawa et al. ............ 360/126 |
| 5,805,390 A | 9/1998 | Takeura ...................... 360/113 |
| 5,828,213 A | 10/1998 | Hickman ..................... 324/235 |
| 6,504,677 B1 * | 1/2003 | Han et al. .................... 360/126 |
| 2002/0066177 A1 | 6/2002 | Takada et al. ........... 29/603.07 |
| 2002/0133934 A1 | 9/2002 | Santini ..................... 29/603.09 |

FOREIGN PATENT DOCUMENTS

JP            58068219 A  *  4/1983

* cited by examiner

*Primary Examiner*—Paul D. Kim
(74) *Attorney, Agent, or Firm*—Robert O. Guillot; Intellectual Property Law Offices

(57) ABSTRACT

The perpendicular magnetic head fabrication and testing method includes the additional fabrication of magnetic pole testing structures in the kerf area of the wafer substrate. Particularly, magnetic interconnect pieces are fabricated in the kerf area to magnetically connect an extending portion of the first magnetic pole with an extending portion of the second magnetic pole. As a result, when the perpendicular magnetic heads are fabricated at the wafer level, the first and second magnetic poles are interconnected through structures located in the kerf area. Thereafter, an ISAT magnetic pole test can be conducted by passing electrical current through the induction coil of the magnetic head, and magnetic flux will flow through the interconnected magnetic pole structure, thereby enabling the testing of the magnetic poles of the perpendicular magnetic head at the wafer level.

22 Claims, 2 Drawing Sheets

METHOD TO DETECT MAGNETIC POLE DEFECTS IN PERPENDICULAR RECORDING HEADS AT WAFER LEVEL

BACKGROUND OF THE INVENTION

1. Field of the Invention

The present invention relates generally to magnetic pole defect detection methods, and more particularly to methods for detecting magnetic pole defects in perpendicular recording heads during fabrication at the wafer level.

2. Description of the Prior Art

Magnetic heads for hard disk drives are fabricated in large quantities upon the surface of a wafer substrate. Following the wafer level fabrication process steps, the wafer is cut into a plurality of rows of magnetic heads, and further process steps are then undertaken towards the completion of the magnetic heads. To save processing time, materials, and expenses, it is desirable to test the magnetic heads during the wafer level fabrication steps. With regard to longitudinal magnetic heads, a prior art magnetic pole defect detection method has been developed in which electrical current is passed through the induction coil of the magnetic head, and corresponding magnetic flux flow through the magnetic poles is measured. Therefore, with regard to prior art longitudinal magnetic heads, a magnetic pole defect testing method exists and is utilized.

With regard to perpendicular magnetic heads, the prior art magnetic pole defect detecting method is not successful. This is because a large gap exists between the magnetic poles of a perpendicular magnetic head, such that magnetic flux does not flow through the magnetic poles when an electrical current is passed through the induction coil. As a result, magnetic pole defect testing of perpendicular magnetic heads at the wafer level cannot be readily accomplished. This results in increased fabrication time, materials and expenses where defective perpendicular magnetic heads at the wafer level must undergo further fabrication steps because the magnetic pole defects are not detectable at the wafer level. There is therefore a need for a magnetic pole defect testing method for perpendicular magnetic heads that can be utilized at the wafer level to identify defective magnetic heads.

SUMMARY OF THE INVENTION

The perpendicular magnetic head fabrication and testing method of the present invention includes the additional fabrication of magnetic pole testing structures in the said cut, or kerf, area of the wafer substrate. Particularly, during the magnetic pole fabrication steps, magnetic interconnect pieces are fabricated in the kerf area to magnetically connect an extending portion of the first magnetic pole with an extending portion of the second magnetic pole. As a result, when the perpendicular magnetic heads are fabricated at the wafer level, the first and second magnetic poles are interconnected through structures located in the kerf area. Thereafter, an ISAT magnetic pole test can be conducted by passing electrical current through the induction coil of the magnetic head, and magnetic flux will flow through the interconnected magnetic pole structure, thereby enabling the testing of the magnetic poles of the perpendicular magnetic head at the wafer level. When the wafer is later cut into rows of magnetic heads, the interconnecting magnetic pole structures that were fabricated in the kerf area are removed.

It is an advantage of the method for fabricating a perpendicular magnetic head of the present invention that the magnetic poles of the perpendicular magnetic head can be tested at the wafer level.

It is another advantage of the method for fabricating a perpendicular magnetic head of the present invention that magnetic pole test structures are fabricated in the kerf area of the wafer substrate, such that the test structures are removed when the wafer is cut into rows.

It is a further advantage of the method for fabricating a perpendicular magnetic head of the present invention that fabrication time, materials, and expenses are reduced.

It is an advantage of the method for testing the magnetic pole structure of a perpendicular magnetic head of the present invention that the testing is conducted at the wafer level of the fabrication process.

It is another advantage of the method for testing the magnetic pole structure of a perpendicular magnetic head of the present invention that magnetic pole test structures are fabricated in the kerf area of the wafer substrate, such that the test structures are removed when the wafer is cut into rows.

It is a further advantage of the method for testing the magnetic pole structure of a perpendicular magnetic head of the present invention that fabrication time, materials, and expenses are reduced.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Magnetic heads for hard disk drives are fabricated in large quantities upon the surface of a wafer substrate. Following the wafer level fabrication process steps, the wafer is sliced into rows of magnetic heads and further processing steps are conducted upon the edges of the rows. Following the row level fabrication steps, the rows of magnetic heads are further sliced to create individual magnetic heads for ultimate incorporation into hard disk drives. During the fabrication process, when the magnetic heads are still at the wafer level, it is desirable to test the magnetic heads to determine whether the various fabrication steps have been conducted properly. One important test is called the ISAT test and it is conducted to determine whether the magnetic poles of the magnetic write heads have been properly fabricated.

Generally, there are two types of magnetic heads, termed longitudinal magnetic heads and perpendicular magnetic heads. As is well known, the ISAT test of the magnetic poles of a longitudinal magnetic head has been conducted in the prior art, whereas an ISAT test of the magnetic poles of a perpendicular magnetic head has not, due to inherent structural features of perpendicular magnetic heads. The present invention provides a device and method for conducting an ISAT test of the magnetic poles of a perpendicular magnetic head, as is described herebelow.

Figure 1:
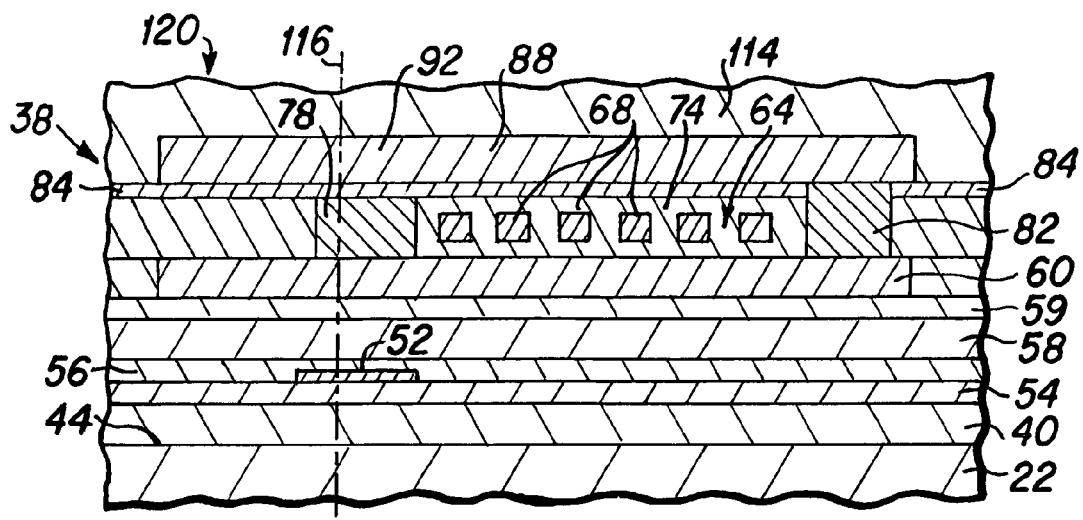
FIG. 1 is a cross-sectional view depicting a prior art longitudinal magnetic head.

FIG. 1 is a side cross-sectional view of a prior art longitudinal magnetic head 38 as fabricated at the wafer level of the fabrication process. As is seen in FIG. 1, the magnetic head 38 includes a first magnetic shield (S1) 40 that is formed upon a surface 44 of the slider substrate 22. A read head sensor element 52 is disposed within electrical insulation layers 54 and 56 and a second magnetic shield (S2) 58 is formed upon the insulation layer 56. A non-magnetic insulation layer 59 is then deposited upon the S2 shield 58, and a first magnetic pole (P1) 60 is fabricated upon the insulation layer 59.

Following the fabrication of the P1 pole 60, an induction coil structure 64 including coil turns 68 is then fabricated within insulation 74 above the P1 pole 60. Thereafter, a P1 pole pedestal 78 and back gap piece 82 are fabricated in contact with portions of the P1 pole 60. A write gap layer 84 is then fabricated above the P1 pole pedestal 78. Thereafter, a second magnetic pole 88 including a narrow P2 pole tip 92 is fabricated in magnetic connection through back gap element 82 to the P1 pole 60. The P2 pole tip 92 is separated from the P1 pole pedestal 78 by the thin write gap layer 84. Following the fabrication of electrical interconnects (not shown), a further insulation layer 114 is ultimately deposited to encapsulate the magnetic head. An ISAT test (described herebelow) of the magnetic pole of the longitudinal magnetic head 38 is then conducted while the head is still at the wafer fabrication level.

The magnetic head 38 is subsequently fabricated such that an air bearing surface (ABS) 116 is created. To accomplish this, the wafer is cut into rows of magnetic heads, where the saw cut is made in the region 120 of the wafer surface, termed herein the kerf area 120, that is on the side of the ABS 116 away from the magnetic head components such as the induction coil 64.

It is to be understood that there are many detailed features and fabrication steps of the magnetic head 38 that are well known to those skilled in the art, and which are not deemed necessary to describe herein in order to provide a full understanding of the present invention. Also, many other types of longitudinal magnetic heads exist, and are similarly fabricated such that a thin write gap layer 84 separates the two magnetic poles.

Figure 2:
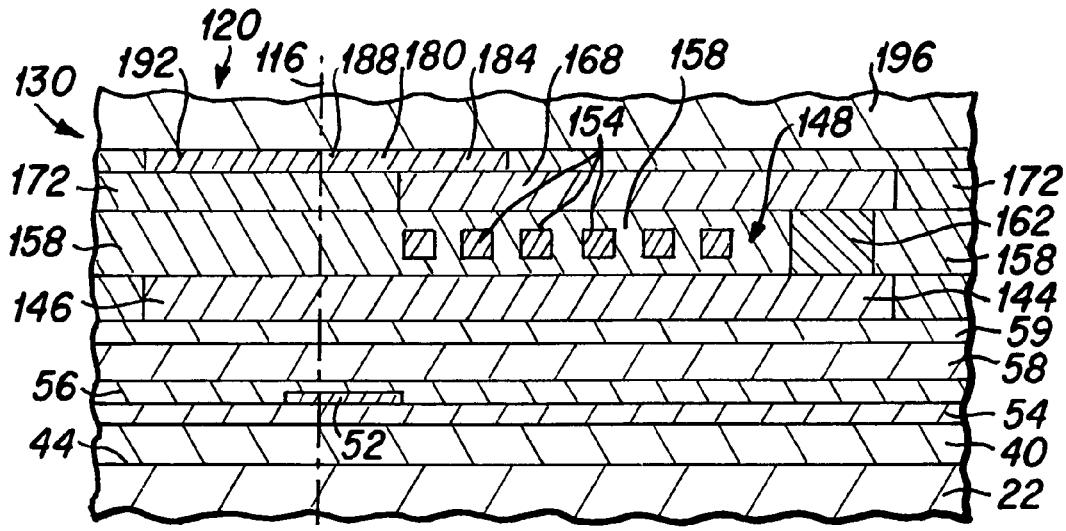
FIG. 2 is a cross-sectional view depicting a prior art perpendicular magnetic head.
Figure 3:
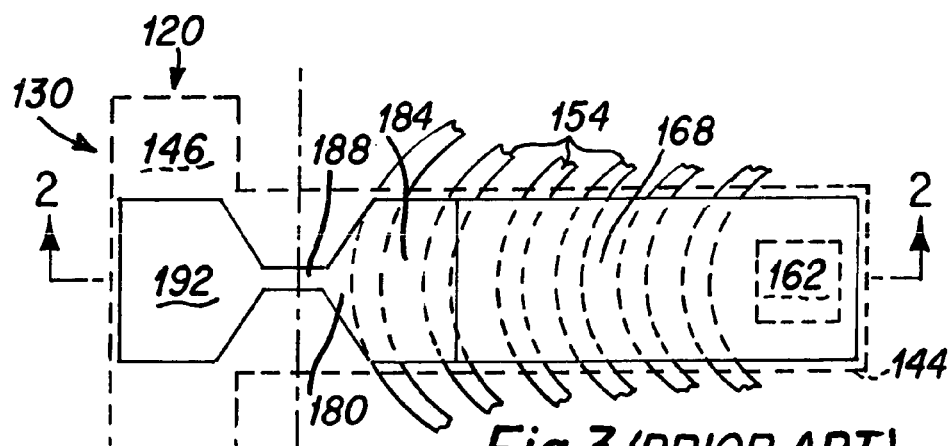
FIG. 3 is a top plan view depicting the prior art perpendicular magnetic head of FIG. 2, where section lines 2-2 are provided in FIG. 3 such that the relationship between FIGS. 2 and 3 is more easily understood.

FIGS. 2 and 3 depict a prior art perpendicular magnetic head 130 during the wafer level fabrication process, in which FIG. 2 is a side cross-sectional view, and FIG. 3 is a top plan view, wherein section lines 2-2 are provided in FIG. 3 to facilitate the understanding of the relationship between FIGS. 2 and 3. As depicted in FIGS. 2 and 3, the perpendicular magnetic head 130 includes a first magnetic shield (S1) 40 that is formed upon a surface 44 of the slider substrate 22. A read head sensor element 52 is disposed within electrical insulation layers 54 and 56 and a second magnetic shield (S2) 58 is formed upon the insulation layer 56. An electrical insulation layer 59 is then deposited upon the second magnetic shield 58.

A first magnetic pole 144 is next fabricated upon the insulation layer 59. The first magnetic pole 144 includes a projecting portion 146 that extends into the kerf area 120 of the wafer surface. An induction coil structure 148 including coil turns 154 that are fabricated within insulation 158 is then fabricated upon the first magnetic pole 144. A back gap piece 162 is next formed within the insulation layer 158 in magnetic connection with the first magnetic pole 144. A shaping piece 168 of the second magnetic pole is then fabricated within an insulation layer 172 above the induction coil structure 148 and in magnetic connection with the back gap piece 162. Thereafter, pole tip piece 180 of the second magnetic pole is fabricated upon the shaping pole piece 168. As is best seen in FIG. 3, the second magnetic pole tip piece 180 includes a relatively broad portion 184 that is fabricated upon the shaping pole piece 168, a narrow P2 pole tip portion 188 that projects across the future location of the air bearing surface 116, and a relatively large anchor portion 192 that is formed in the kerf area 120 on the opposite side of the air bearing surface 116 from the magnetic head side of the air bearing surface. Following the fabrication of electrical interconnects (not shown), a further insulation layer 196 is deposited across the surface of the wafer to encapsulate the magnetic head. When the wafer level fabrication steps of the perpendicular magnetic head 130 are completed, the wafer is cut in the kerf area 120 relatively close to the air bearing surface 116, such that the projecting portion 146 of the first magnetic pole and the anchor portion 192 of the second magnetic pole 180 are removed, and the air bearing surface (ABS) 116 is subsequently created.

It is to be understood that there are many detailed features and fabrication steps of the perpendicular magnetic head 130 that are well known to those skilled in the art, and which are not deemed necessary to describe herein in order to provide a full understanding of the present invention. Also, other types of perpendicular magnetic heads, all generally having a relatively large gap between the first magnetic pole 144 and the P2 pole tip 188 are well known to those skilled in the art. Such perpendicular magnetic heads are included within the contemplation of the present invention, as is described herebelow.

A wafer level magnetic pole testing method, termed the ISAT test, is next described with reference to the prior art longitudinal magnetic head 38 and the prior art perpendicular magnetic head 130. With particular reference to the longitudinal magnetic head 38, following the fabrication of the magnetic heads 38, and while they are still at the wafer fabrication level, a test electrical current is caused to pass through the induction coil 68 of a head being tested. The electric current includes a DC component with an AC component. As the DC electrical current passes through the induction coil, it causes magnetic flux to flow through the magnetic poles; that is, through the P1 pole 60, the back gap 82, the second magnetic pole 88, through the P2 pole tip 92, across the write gap layer 84, into the P1 pole pedestal 78, and back to the P1 pole 60 to complete the magnetic flux circuit. Where the magnetic pole structures are properly fabricated, the magnetic poles will become magnetically saturated, and the saturation can be detected by a drop in the inductance of the circuit, which is measured by a change in the AC current flowing through the induction coil. Conversely, where a manufacturing defect exists in the magnetic poles, such as a defective or even missing P2 pole tip, the magnetic pole saturation will not occur and the inductance will not drop, as determined by the AC current flow. The AC current measurement of inductance is thus utilized as an indication of a defectively fabricated magnetic pole structure of the longitudinal magnetic head. The ISAT test therefore is used at the wafer level to test the magnetic pole structure of longitudinal magnetic heads.

With reference to the perpendicular magnetic head 130 depicted in FIGS. 2 and 3, and with particular regard to the cross-sectional view of FIG. 2, it is seen that a large gap exists between the P1 pole 144 and the P2 pole tip 188; that gap being filled by insulation layers 158 and 172. As a result of this large gap, the ISAT test cannot be successfully performed on the prior art perpendicular magnetic heads. This is because even though current can be caused to flow through the induction coil 154, magnetic flux cannot flow through the magnetic pole structure due to the large gap between the P1 pole 144 and the P2 pole tip 188. The present invention provides a perpendicular magnetic head fabrication method which permits the ISAT testing of the magnetic poles of the perpendicular magnetic head at the wafer level, as is next described.

Figure 4:
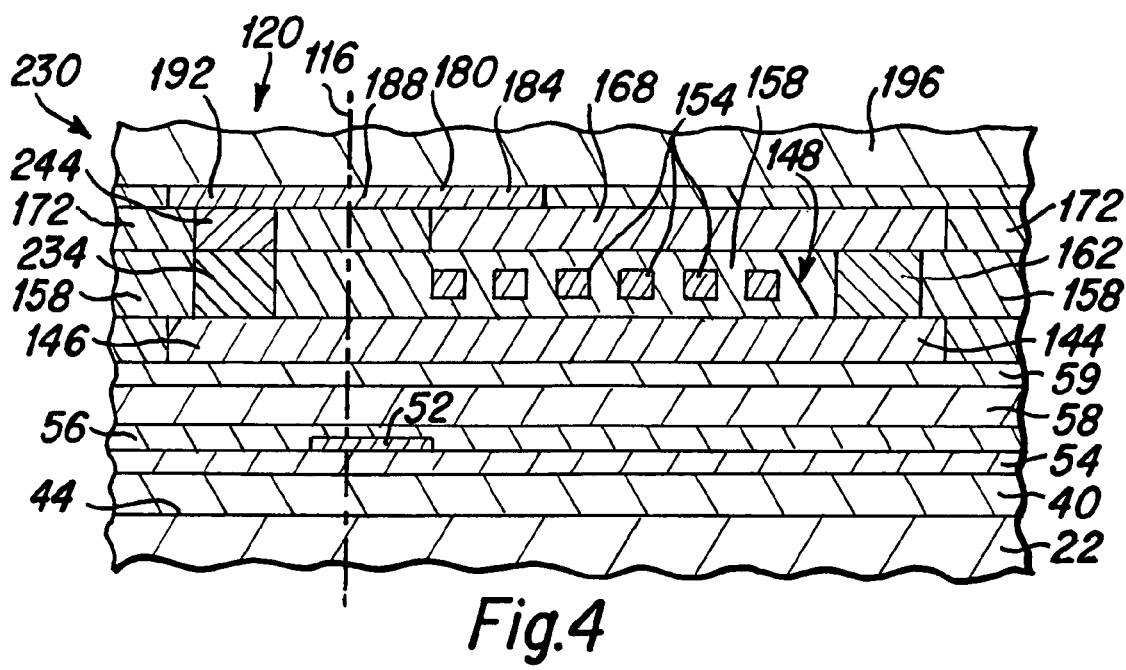
FIG. 4 is a side cross-sectional view of a perpendicular magnetic head of the present invention.
Figure 5:
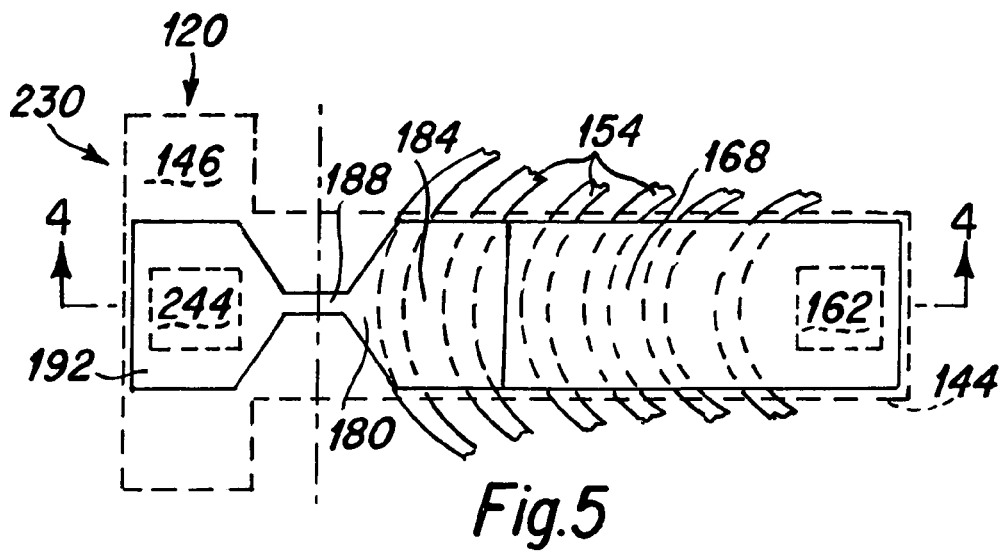
FIG. 5 is a top plan view of the perpendicular head of the present invention, where section lines 4-4 are provided such that the relationship between FIGS. 4 and 5 is more easily understood.

FIGS. 4 and 5 depict a perpendicular magnetic head 230 of the present invention during the wafer level fabrication process, in which FIG. 4 is a side cross-sectional view, and FIG. 5 is a top plan view, and wherein section lines 4-4 are provided in FIG. 5 to facilitate the understanding of the relationship between FIGS. 4 and 5. The perpendicular magnetic head 230 may include features and structures that are substantially identical to features and structures of the prior art perpendicular magnetic head 130 depicted in FIGS. 2 and 3, and such substantially identical features and structures are identically numbered for ease of comprehension.

As depicted in FIGS. 4 and 5, the perpendicular magnetic head 230 includes a first magnetic shield (S1) 40 that is formed upon a surface 44 of the slider substrate 22. A read head sensor element 52 is disposed within electrical insulation layers 54 and 56 and a second magnetic shield (S2) 58 is formed upon the insulation layer 56. An electrical insulation layer 59 is then deposited upon the second magnetic shield 58.

A first magnetic pole 144 is next fabricated upon the insulation layer 59. The first magnetic pole 144 includes a projecting portion 146 that extends into the kerf area 120 of the wafer surface. An induction coil structure 148 including coil turns 154 that are fabricated within insulation 158 is then fabricated upon the first magnetic pole 144. A back gap piece 162 is next formed within the insulation layer 158 in magnetic connection with the first magnetic pole 144. Significantly, a first magnetic interconnect piece 234 is fabricated within the insulation layer 158, preferably in the same process step and with the same material as the back gap piece 162. The first magnetic interconnect piece 234 is fabricated in the kerf area 120, upon and in magnetic connection with the projecting portion 146 of the first magnetic pole 144. A second magnetic pole shaping piece 168 is then fabricated within an insulation layer 172 above the induction coil structure 148 and in magnetic connection with the back gap piece 162. Significantly, a second magnetic interconnect piece 244 is fabricated within the insulation layer 172, preferably in the same process step and with the same material as the shaping pole piece 168. The second magnetic interconnect piece 244 is fabricated in the kerf area 120 upon and in magnetic connection with the first interconnect piece 234.

Thereafter, a second magnetic pole tip piece 180 is fabricated upon the shaping pole piece 168. As is best seen in FIG. 5, the second magnetic pole tip piece 180 includes a relatively broad portion 184 that is fabricated upon the shaping pole piece 168, and a narrow P2 pole tip portion 188 that projects across the future location of the air bearing surface 116, and a relatively large anchor portion 192 that is formed in the kerf area 120. The anchor portion 192 is fabricated upon and in magnetic connection with the second magnetic interconnect piece 244. Following the fabrication of electrical interconnects (not shown), a further insulation layer 196 is deposited across the surface of the wafer to encapsulate the magnetic head. An ISAT test of the magnetic poles of the perpendicular magnetic head (as described below) can now be conducted at the wafer level. When all of the wafer level fabrication steps of the perpendicular magnetic head 230 are completed, the wafer is cut in the kerf area 120 relatively close to the air bearing surface 116, such that the projecting portion 148 of the first magnetic pole 144, the first and second interconnect pieces 234 and 244, respectively, together with the anchor portion 192 of the second magnetic pole tip piece 180 will all be removed, and the air bearing surface (ABS) 116 is subsequently created.

It can now be understood that at the wafer level of the fabrication of the perpendicular magnetic head 230 of the present invention, that the two magnetic interconnect pieces 234 and 244 serve to create a closed magnetic pole flux circuit within the wafer level of the perpendicular magnetic head, such that an ISAT test can now be conducted on the perpendicular magnetic head 230.

With particular reference to the perpendicular magnetic head 230, following the wafer level fabrication of the magnetic heads 230, and while they are still at the wafer fabrication level, an ISAT test is conducted by causing a test electrical current to pass through the induction coil 154. As with the ISAT test of a longitudinal head, the electric current includes a DC component with an AC component. As the electrical current passes through the induction coil, it causes magnetic flux to flow through the magnetic poles; that is, through the P1 pole 144, the back gap 162, the shaping pole piece 168, through the pole tip piece 180 and the P2 pole tip 188, across to the anchor piece 192, into and through the second interconnect piece 244, through the first interconnect piece 234, through the projecting portion 148 of the P1 pole 144 and back into the P1 pole 144 to complete the magnetic flux circuit. Where the magnetic pole structures are properly fabricated, the magnetic poles will become magnetically saturated, and the saturation can be detected by a drop in the inductance of the circuit, which is measured by a change in the AC current flowing through the induction coil. Conversely, where a manufacturing defect exists in the magnetic poles, such as a defective or even missing P2 pole tip, the magnetic pole saturation will not occur and the inductance will not drop, as determined by the AC current flow. The AC current measurement of inductance is thus utilized as an indication of a defectively fabricated magnetic pole structure of the perpendicular magnetic head 230. The ISAT test therefore can now be used at the wafer level to test the magnetic pole structure of perpendicular magnetic heads.

It is to be understood that there are many detailed features and fabrication steps of the perpendicular magnetic head 230 that are well known to those skilled in the art, and which are not deemed necessary to describe herein in order to provide a full understanding of the present invention. Also, other types of perpendicular magnetic heads, all generally having a relatively large gap between the first magnetic pole 144 and the P2 pole tip 188 are well known to those skilled in the art. Such perpendicular magnetic heads are included within the contemplation of the present invention.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A method for testing the magnetic pole structure of a perpendicular magnetic head, comprising:
    fabricating a magnetic head upon a wafer substrate surface, including:
        fabricating a first magnetic pole structure having a first magnetic pole portion and a projecting portion that extends within a kerf area of said wafer substrate surface;
        fabricating an induction coil structure upon said first magnetic pole;
        fabricating a back gap piece in magnetic connection with said first magnetic pole;
        fabricating a first magnetic interconnect piece in magnetic connection with said projecting portion of said first magnetic pole;
        fabricating a second magnetic pole structure above said induction coil; said second magnetic pole structure including a second magnetic pole portion disposed in magnetic connection with said back gap piece, and a portion disposed in said kerf area in magnetic connection with said first interconnect piece;
        passing an electrical current through said induction coil and measuring changes in said electrical current as an indication that the first and second magnetic poles of said magnetic head are properly fabricated.

2. The method for testing the magnetic poles of a perpendicular magnetic head as described in claim 1, wherein said second magnetic pole structure includes a shaping pole piece being in magnetic connection with said back gap piece, and a pole tip piece having a first enlarged portion being in magnetic connection with said shaping pole piece, a pole tip portion, and an enlarged anchor portion that is disposed in said kerf area;
    and wherein a second interconnect piece is formed upon said first interconnect piece, and wherein said anchor piece is formed upon said second interconnect piece.

3. The method for testing the magnetic poles of a perpendicular magnetic head as described in claim 2 wherein said back gap piece and said first interconnect piece are fabricated within the same insulation layer.

4. The method for testing the magnetic poles of a perpendicular magnetic head as described in claim 2 wherein said back gap piece and said first interconnect member are fabricated of the same material.

5. The method for testing the magnetic poles of a perpendicular magnetic head as described in claim 2, wherein said first interconnect piece and said back gap piece are simultaneously fabricated.

6. The method for testing the magnetic poles of a perpendicular magnetic head as described in claim 2 wherein said shaping pole piece and said second interconnect member are fabricated within the same insulation layer.

7. The method for testing the magnetic poles of a perpendicular magnetic head as described in claim 2 wherein said shaping pole piece and said second magnetic interconnect member are fabricated of the same material.

8. The method for testing the magnetic poles of a perpendicular magnetic head as described in claim 2 wherein said shaping pole piece and said second interconnect piece are simultaneously fabricated.

9. The method for testing the magnetic poles of a perpendicular magnetic head as described in claim 2 wherein said first interconnect piece and said second interconnect piece form a closed magnetic flux path between said first magnetic pole structure, said back gap piece and said second magnetic pole structure.

10. The method for testing the magnetic poles of a perpendicular magnetic head as described in claim 2, including the further steps of removing said first interconnect piece and said second interconnect piece from said magnetic head subsequent to said testing of said magnetic pole structure.

11. The method for testing the magnetic poles of a perpendicular magnetic head as described in claim 1 wherein said electrical current includes a DC component and an AC component.

12. A The method for fabricating a perpendicular magnetic head, comprising:
    fabricating a first magnetic pole structure upon a wafer substrate surface, said first magnetic pole structure having a first magnetic pole portion and a projecting portion that extends within a kerf area of said wafer substrate surface;
    fabricating an induction coil structure upon said first magnetic pole;
    fabricating a back gap piece in magnetic connection with said first magnetic pole;
    fabricating a first magnetic interconnect piece in magnetic connection with said projecting portion of said first magnetic pole;
    fabricating a second magnetic pole structure above said induction coil; said second magnetic pole structure including a second magnetic pole portion disposed in magnetic connection with said back gap piece, and a portion disposed in said kerf area in magnetic connection with said first interconnect piece;
    passing an electrical current through said induction coil and measuring changes in said electrical current as an indication that the first and second magnetic poles of said magnetic head are properly fabricated;
    cutting said wafer substrate into a plurality of rows of magnetic heads; and
    fabricating an air bearing surface of said magnetic head.

13. The method for fabricating a perpendicular magnetic head as described in claim 12, wherein said second magnetic pole structure includes a shaping pole piece being in magnetic connection with said back gap piece, and a pole tip piece having a first enlarged portion being in magnetic connection with said shaping pole piece, a pole tip portion, and an enlarged anchor portion that is disposed in said kerf area;
    and wherein a second interconnect piece is formed upon said first interconnect piece, and wherein said anchor piece is formed upon said second interconnect piece.

14. The method for fabricating a perpendicular magnetic head as described in claim 13 wherein said back gap piece and said first interconnect piece are fabricated within the same insulation layer.

15. The method for fabricating a perpendicular magnetic head as described in claim 13 wherein said back gap piece and said first interconnect member are fabricated of the same material.

16. The method for fabricating a perpendicular magnetic head as described in claim 13, wherein said first interconnect piece and said back gap piece are simultaneously fabricated.

17. The method for fabricating a perpendicular magnetic head as described in claim 13 wherein said shaping pole piece and said second interconnect member are fabricated within the same insulation layer.

18. The method for fabricating a perpendicular magnetic head as described in claim 13 wherein said shaping pole piece and said second magnetic interconnect member are fabricated of the same material.

19. The method for fabricating a perpendicular magnetic head as described in claim 13 wherein said shaping pole piece and said second interconnect piece are simultaneously fabricated.

20. The method for fabricating a perpendicular magnetic head as described in claim 13 wherein said first interconnect piece and said second interconnect piece form a closed magnetic flux path between said first magnetic pole structure, said back gap piece and said second magnetic pole structure.

21. A method for fabricating a perpendicular magnetic head as described in claim 13, including the further steps of removing said first interconnect piece and said second interconnect piece from said magnetic head subsequent to said testing of said magnetic pole structure.

22. The method for fabricating a perpendicular magnetic head as described in claim 12 wherein said electrical current includes a DC component and an AC component.

* * * * *